United States Patent
Skeel et al.

(10) Patent No.: US 8,732,795 B2
(45) Date of Patent: May 20, 2014

(54) SYSTEM AND METHOD FOR USER AUTHENTICATION

(75) Inventors: Trent N. Skeel, Madison, WI (US); Eric W. Cooper, Madison, WI (US); Travis Keshav, Verona, WI (US)

(73) Assignee: Epic Systems Corporation, Verona, WI (US)

( * ) Notice: Subject to any disclaimer, the term of this patent is extended or adjusted under 35 U.S.C. 154(b) by 119 days.

(21) Appl. No.: 13/111,290

(22) Filed: May 19, 2011

(65) Prior Publication Data

US 2011/0289572 A1    Nov. 24, 2011

Related U.S. Application Data

(60) Provisional application No. 61/447,316, filed on Feb. 28, 2011, provisional application No. 61/347,116, filed on May 21, 2010.

(51) Int. Cl.

| | |
|---|---|
| *G06F 7/04* | (2006.01) |
| *H04L 9/32* | (2006.01) |
| *H04L 29/06* | (2006.01) |
| *H04L 29/08* | (2006.01) |
| *H04L 9/00* | (2006.01) |

(52) U.S. Cl.
CPC ............... *H04L 9/32* (2013.01); *H04L 63/083* (2013.01); *H04L 67/146* (2013.01); *H04L 2463/082* (2013.01); *H04L 9/00* (2013.01); *H04L 9/006* (2013.01); *H04L 63/08* (2013.01); *H04L 63/0807* (2013.01)

USPC ................ 726/2; 726/3; 726/4; 726/5; 726/6; 726/7; 726/17; 726/20; 726/21; 726/27; 370/310; 370/328; 370/331; 382/124; 340/5.83; 380/229; 380/232

(58) Field of Classification Search
CPC ....................... H04L 67/146; H04L 2463/082
USPC ........ 726/2–7, 17–21, 27; 382/124; 340/5.83; 370/310, 328, 331; 380/229, 232
See application file for complete search history.

(56) References Cited

U.S. PATENT DOCUMENTS

| | | | |
|---|---|---|---|
| 7,681,242 B2 * | 3/2010 | Green et al. ..................... | 726/27 |
| 7,961,684 B2 * | 6/2011 | Sood ............................. | 370/331 |
| 2006/0098849 A1 * | 5/2006 | Woodward .................... | 382/124 |
| 2011/0246235 A1 | 10/2011 | Powell et al. | |

* cited by examiner

*Primary Examiner* — Thanhnga B Truong
(74) *Attorney, Agent, or Firm* — Boyle Fredrickson, S.C.

(57) ABSTRACT

A computer-implemented authentication method is described. The method includes the steps of (a) receiving an authentication request at an authentication computing system, the request including a resource identifier, (b) identifying one or more authentication pools associated with the resource identifier, each authentication pool including at least one authentication method implementation, (c) executing a pool authentication process for the one or more identified authentication pools, and (d) transmitting a response to the identification authentication request based on the execution of the pool authentication process for the one or more identified authentication pools.

20 Claims, 5 Drawing Sheets

SYSTEM AND METHOD FOR USER AUTHENTICATION

CROSS REFERENCE TO RELATED APPLICATIONS

This application claims the benefit of U.S. Provisional Patent Application 61/447,316, filed Feb. 28, 2011 and U.S. Provisional Application No. 61/347,116, filed May 21, 2010, both of which hereby incorporated by reference in their entirety.

BACKGROUND OF THE INVENTION

The present invention relates generally to authentication systems and methods and, in particular, to a system and method for implementing an authentication function using authentication pools.

Authentication includes using systems and methods to perform an identification that is verified in some manner. The identification may be an identification of a user, identification of a patient, identification of a medication, etc. Authentication is generally used in any situation where establishing a correct identity is important. For example, when a patient enters a healthcare provider location, it is important that the healthcare provider be able to take steps to verify the true identity of the patient. According to another example, a healthcare provider administering a medication to a patient must be able to verify both the identification of the patient being administered and that the medication to be administered is correct.

A large number and variety of authentication methods are known in the art. For example, authentication methods may include direct authentication, passive authentication, and search authentication. An example of direct authentication is a process where the system requests identification of a specific patient and waits until this identification is provided or cancelled to proceed. An example of passive authentication is a process where the system indicates that identification may be provided identifying a specific patient, but that such authentication is not required to proceed, and that the identification data will be processed when received. An example of search authentication is a process where the system does not receive identification information for the patient, and therefore requests identification data from one or more devices to make an identification. For example, using the example of the patient entering a healthcare provider location, the healthcare provider may verify the identity of the patient using one or more authentication methods, such as requesting that the patient provides an identifying document, requesting that the patient provide identifying information, requesting that the patient provide biometric information, etc.

In some instances, authentication systems and/or methods may be prescribed or mandated based on an external requirement, such as legislation. For example, in order to maintain patient confidentiality, legislation may exist that requires the use of specific authentication methods prior to allowing a user to access protected patient health information.

Computer systems implementing authentication are typically programmed to implement specific authentication systems and methods. Programming individual systems to use specific authentication methods reduces system flexibility and may tie a system to a particular authentication system, method, or provider. Hardcoded and system specific authentication systems and methods may be difficult and expensive to reconfigure as necessitated by changing technologies, requirements, legislation, etc.

What is needed is a system and method for providing authentication in a configurable system using a variable number and type of authentication systems and methods. What is further needed is such a system and method configured to implement one or more authentication pools, each pool including at least one authentication method implementation.

SUMMARY OF THE INVENTION

The present invention provides a computer-implemented authentication method. The method includes the steps of (a) receiving an authentication request at an authentication computing system, the request including a resource identifier, (b) identifying one or more authentication pools associated with the resource identifier, each authentication pool including at least one authentication method implementation, (c) executing a pool authentication process for the one or more identified authentication pools, and (d) transmitting a response to the identification authentication request based on the execution of the pool authentication process for the one or more identified authentication pools.

It is thus one feature of at least one embodiment of the invention, where executing a pool authentication process includes identifying one or more authentication method implementations. According to another feature, executing a pool authentication process further includes generating an authentication method response. Generating the response includes transmitting information to one or more of the identified authentication method implementations and generating a device authentication response based on the transmitted information.

The method may be further configured to include determining whether an authentication method implementation has been used in the current authentication process in any authentication pool. The method may also include selecting an alternate method implementation from an authentication pool based on a determination that an authentication method implementation has been used in the current authentication process.

In one exemplary embodiment of the invention, identifying one or more authentication pools associated with the resource identifier can be performed by accessing an authentication database including a table of resource identifiers and a table of authentication pools. In the embodiment, each resource identifier includes an association with one or more authentication pools and each authentication pool includes an association with one or more authentication method implementations.

In another exemplary embodiment of the invention, the table includes at least one authentication method implementation associated with more than one authentication pool.

It is thus one feature of at least one embodiment of the invention that the authentication request includes a request to identify a patient seeking medical care using a biometric reader as at least one authentication method implementation in the authentication process. Another feature includes where the authentication request includes a request to identify a medicine to be administered to a patient using a barcode reader as at least one authentication method implementation in the authentication process.

The present invention may further be implemented using a computer-implemented authentication system. The system may be configured to include an authentication data table that includes one or more resource identifiers and at least one authentication pool associated with the resource identifier, the pool including at least one authentication method implementation. The system may further include an authentication engine configured to receive an authentication request at an authentication computing system, the request including a resource identifier, identify one or more authentication pools associated with the resource identifier, and execute a pool authentication process for the one or more identified authentication pools. The system yet further may include an authentication reporting engine configured to provide a response to the identification authentication request based on the execution of the pool authentication process for the one or more identified authentication pools.

Other features and advantages of the invention will become apparent to those skilled in the art upon review of the following detailed description, claims and drawings in which like numerals are used to designate like features.

DETAILED DESCRIPTION OF THE PREFERRED EMBODIMENT

Figure 1:
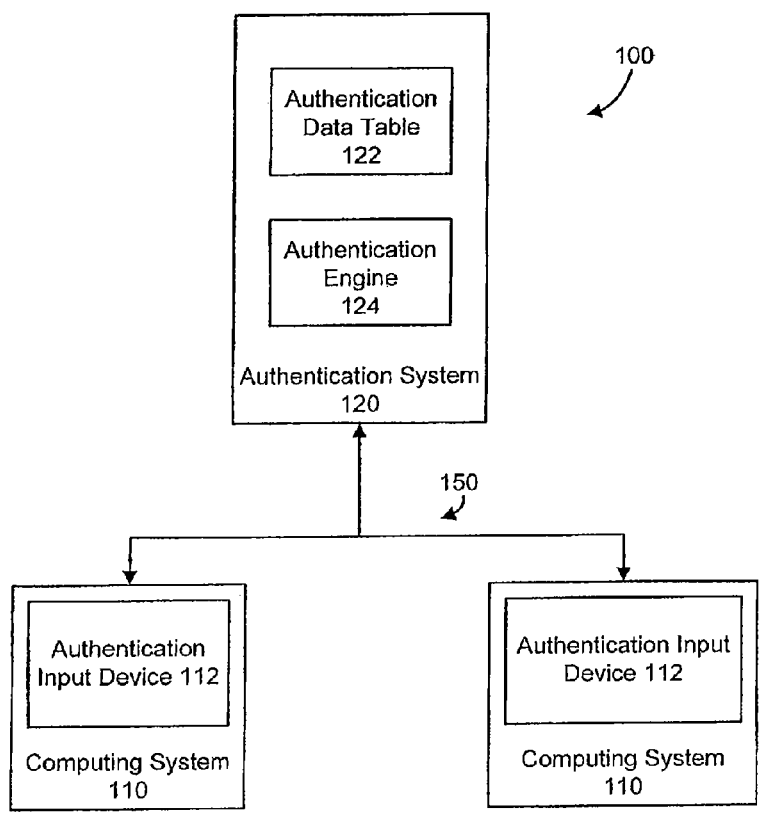
FIG. 1 is an authentication environment where authentication services may be provided to a plurality of computing systems from an authentication computing system configured to implement one or more authentication pools, each authentication pool being associated with at least one authentication implementation method, according to an exemplary embodiment.

Before describing in detail the particular improved system and method, it should be observed that the invention includes, but is not limited to, a novel structural combination of conventional data/signal processing components and communications circuits, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, an authentication environment 100 where authentication services may be provided to a plurality of computing systems 110 from an authentication computing system 120 configured to implement one or more authentication pools, each authentication pool being associated with at least one authentication implementation method, is shown, according to an exemplary embodiment. An authentication pool may be a set of authentication methods and/or devices defined for one iteration for an authentication context, where multiple iterations of authentication (and consequently multiple pools) may exist. Authentication computing system 120 is configured to provide authentication services to computing systems 110 over a network 150.

Authentication services include establishing or confirming an identity of something or someone based on received information. Received information generally includes one or more of three authentication factors. A first authentication factor includes something that is known, such as a password, passphrase, personal identification number, challenge response, etc. A second authentication factor includes something that a user has, such as an identification card, wristband, security token, software token, cell phone, etc. A third authentication factor includes something that a user is, such as biometric information including a fingerprint, retinal pattern, signature, face, voice, etc. In order to positively establish identification, authentication computing system 120 may be configured to provide authentication services based on verification of at least two if not all three types of authentication factors, although multiple variations are possible, as further described below.

Implementing computing systems 110 and authentication system 120 may typically include, but are not required to be, desktop or laptop computers or the like having a display screen, a mechanical keyboard, a mouse or the like communicating with a processor/memory system. Computing systems 110 may be configured to include one or more authentication information input devices 112. It is contemplated that each computing system 110 will be configured to execute one or more programs requiring use of an authentication procedure prior to allowing a user to access and/or utilize at least some functionality associated with computing system 110. For example, computing system 110 may be a computing system located in a reception office of a healthcare provider facility that is configured to allow a user to receive authentication information for a patient and verify the identity of the patient prior to provision of medical services or display of healthcare information. According to another example, a computing system 110 may be a computing system associated with the nursing station allowing a healthcare provider to authenticate the identity, dosage, patient target, etc. for a medication prior to administration of medication.

Authentication input devices 112 may include any methods or devices for receiving information to be used by system 120 in providing authentication services. Exemplary authentication input devices 112 may include, but are not limited to, a keyboard for receiving any password or patient identification number, a biometric reader, an identification card scanner, etc.

Network 150 may be any type of communication network configured to allow transmission of information between computing systems 110 and authentication system 120. Exemplary communication networks may include, but are not limited to, a system bus within a single computing system including computing system 110 and authentication system 120, an intranet, the Internet, etc.

Authentication system 120 may be implemented using a standard computing system including a processor connected to an internal bus with a memory including, for example, volatile random access memory and nonvolatile mass storage memory, such as a hard disk drive. System 120 may further include a communication bus configured to allow communication with one or more interfaces communicating respectively with a network media, such as an Ethernet cable, a keyboard, a mouse, and the display screen.

Authentication system 120 may further be configured to include an authentication system data table 122. Data table 122 may be configured to include designation of one or more authentication pools, each authentication pool associated with a resource identifier. Resource identifiers may include identification of systems, such as computing systems 110, devices, processes, medications, etc. where access to the identified resources is to be controlled based on satisfaction of one or more authentication methods within the associated authentication pools.

Authentication system 120 may yet further be configured to include an authentication engine 124. Authentication engine 124 may be a computer implemented software program executing a plurality of instructions to provide the authentication services identified herein.

Figure 2:
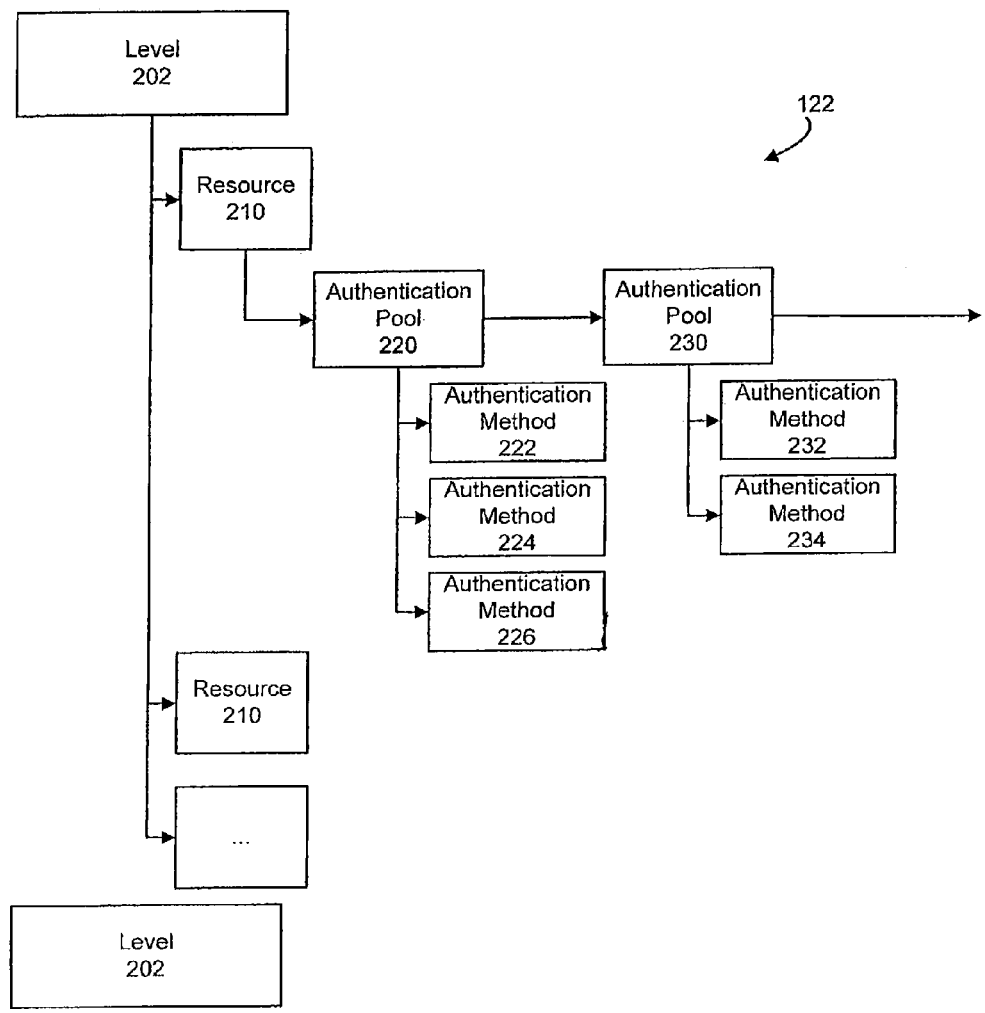
FIG. 2 is a block diagram illustrating the authentication system data table of FIG. 1 including a plurality of authentication pools associated with specific resources is shown, according to an exemplary embodiment.

Referring now to FIG. 2 in addition to FIG. 1, an authentication system data table 122 including a plurality of authentication pools associated with specific resources is shown, according to an exemplary embodiment. Data table 122 may be implemented using a conventional database configured and maintained by a user of authentication system 120 using the authentication engine 124. Although data table 122 is shown in a specific configuration and includes a specific hierarchy, one of ordinary skill in the art would understand that the data table 122 may be implemented using any of a variety of different configurations to implement the functionality described herein.

In one exemplary embodiment, authentication system data table 122 may be organized into a plurality of levels 202, each level 202 including information about the user or their physical location. During the provision of authentication services, authentication engine 124 may be configured to select from the plurality of levels, favoring the most specific level based on received and/or available information. For example, a user identification may be implemented as the most specific level to be used where the user identification is available, and a system wide designation may be implemented as a least precise or least specific level to be used when no more detailed level designation is available.

Associated with each level 202 are one or more resources 210. A resource 210 may be a descriptor for any system, process, action, etc. within the environment 100 where an authentication is required. Each resource 210 may be uniquely identified by a resource identifier. Exemplary resources include a login procedure, a medication order process, a patient check-in process, a patient medical record, etc.

Within data table 122, each resource 210 may be associated with one or more authentication pools 220, each authentication pool further including one or more authentication methods. Each authentication method may include hardware and/or software accessed through an interface and a computing system 110. Examples include, but are not limited to, purely software elements such as passwords, personal identification numbers, etc. and hardware elements such as biometric readers, etc.

Advantageously, associating authentication pools 220 with resource 210 allows a user of engine 124 to easily and quickly manipulate authentication methods associated with any identified resource from a central location. Using engine 124, a user can modify, add, and/or delete authentication methods and/or implementations of authentication methods associated with the resources. These changes may be easily permeated through environment 100 based on accesses to authentication system 120.

Authentication pools 220 may be dynamically configurable to include any number and/or type of authentication methods. An authentication pool 220 may further be configurable such that authentication for that pool will only be successful upon successful implementation of at least one authentication method within the pool 220, all authentication methods within the pool 220, and/or any number of successful implementations within that range. Implementation of authentication pools and authentication methods and their respective success and/or failure is discussed in further detail below with reference to FIG. 3.

According to an alternative embodiment, each authentication pool 220 may be associated with one particular type of authentication factor. For example, an authentication pool may be entirely populated with authentication methods requiring a biometric input. Advantageously, the customizability of the authentication pools allows a user of system 120 to individually control the level of security associated with each resource identifier. For example, using a biometric only authentication pool, the associated authentication pool cannot be satisfied without the physical presence of the user, independent of whether the user has shared their, for example, password and/or ID badge.

In an additional alternative embodiment, authentication pools may further be configured to include structure and/or computer implemented logic affecting the operation of the included authentication methods. For example, when using the structured pools of the alternative embodiment, system 120 may require that, upon failure of a first authentication method, at least two authentication methods within the authentication pool must be thereafter successful. Structured authentication pools may further include a structure such that a first authentication method is performed and, based on the success or failure of that authentication method, different authentication methods within the pool are performed.

Advantageously, authentication pools may be configured to achieve a desired level of authentication. For example, where three authentication devices are in use and it is desirable to require that at least two of the devices are used, authentication may be created to meet the requirement. In particular, table 122 may be configured such that a first authentication pool includes all three authentication devices and a second authentication pool also includes all three authentication devices. Thereafter, system 120 may be configured to require that both authentication pools be successfully passed and successful use of an authentication device to pass the first authentication pool disqualifies that use for passing the second authentication pool.

Data table 122 may be configured such that access to resource 210 is constrained until a successful authentication has been determined for each of the authentication pools associated with that resource. Alternatively, data table 122 may be configured such that access to resource 210 is constrained until successful authentication has been determined for at least one authentication pool associated with that resource, etc. Data table 122 may further be configurable such that successful authentication using a first authentication pool 220 is required prior to attempting authentication using the authentication methods of a second authentication pool 230. Alternatively, data table 122 may be configured to allow authentication using any authentication pool associated with the resource.

According to various exemplary embodiments, authentication methods 222-226 and 232-234 may include biometric authentication methods, possession based authentication methods, knowledge based authentication methods, etc. Each pool may be configured to include multiple types of authentication methods. The authentication methods within each pool may be ordered such that execution of each method in a pool is performed in a prescribed order. Authentication pools may further be structured to include only one type of authentication method. Multiple authentication pools may further be used to define an authentication requirement, such as requiring successful implementation from any one method in a first pool and/or any two methods within a second pool, etc.

Figure 3:
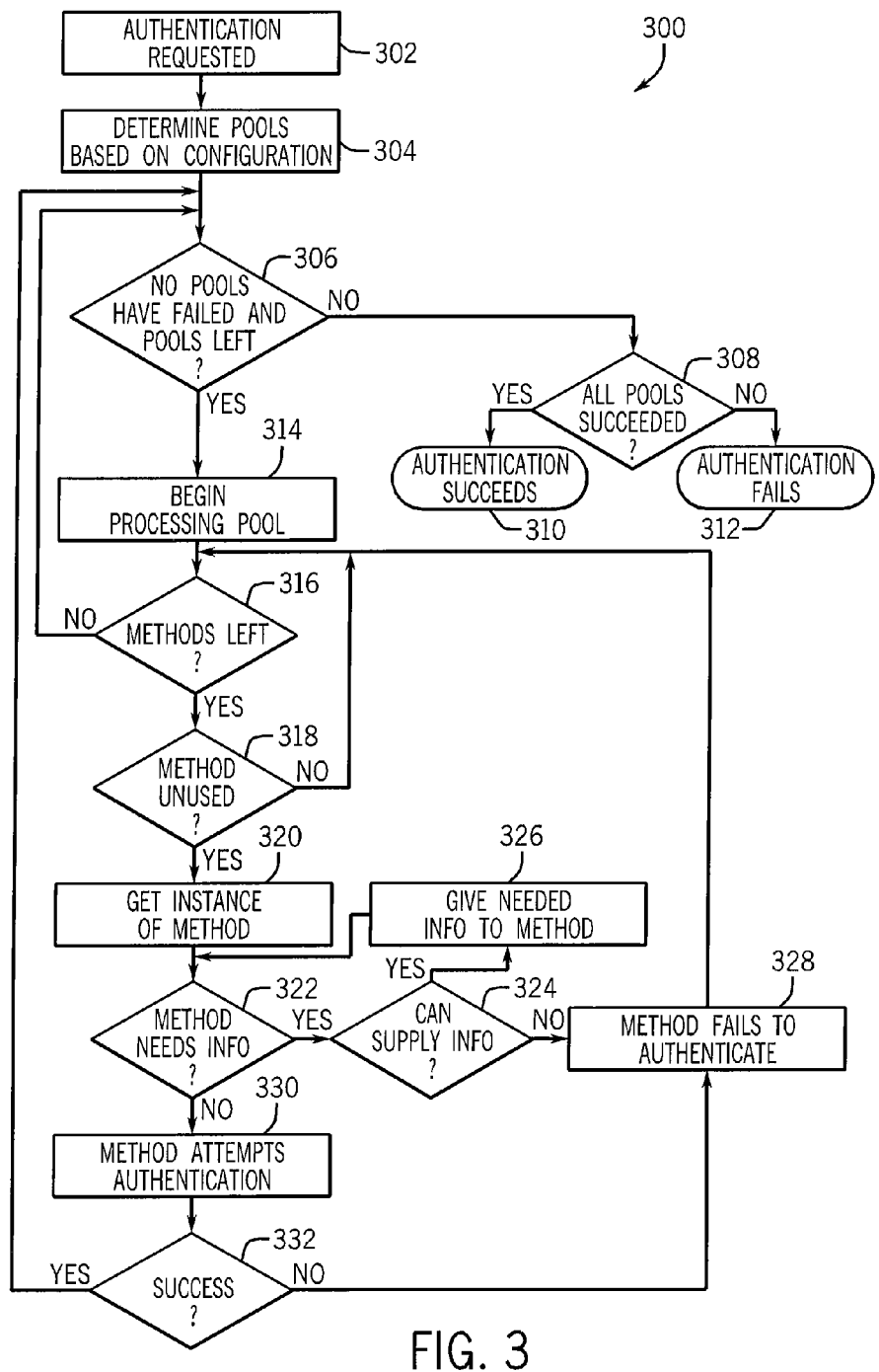
FIG. 3 is a flowchart illustrating a method for providing authentication services in response to a received authentication request to be implemented by the authentication engine of FIG. 1, according to an exemplary embodiment.

Referring now to FIG. 3, a flowchart 300 illustrating a method for providing authentication services in response to a received authentication request to be implemented by authentication engine 124 is shown, according to an exemplary embodiment. Although specific steps are shown in flowchart 300 as being performed in a specific order, it should be understood that the method may be performed using more, fewer, and/or a different ordering of steps to implement the systems and methods described herein.

In a step 302, engine 124 is configured to receive an authentication request. The authentication request may be configured to include a resource identifier and authentication information. The authentication request may be generated by a computer system 110 based on a request to access information and/or processes requiring authentication.

In a step 304, engine 124 may be configured to identify one or more authentication pools associated with the received resource identifier based on information contained in the authentication data table 122. Identifying one or more authentication pools may include first identifying an authentication level 202 associated with the user, the process, etc. A resource 210 may be associated with a plurality of levels, where a determination of the authentication level determines which authentication pool grouping associated with that resource is to be selected.

In a step 306, a determination may be made whether there has been an authentication pool failure for any of the identified authentication pools or whether there exist additional authentication pools to be tested. If all authentication pools were successfully tested and no further pools are remaining, a determination is made in a step 308 whether all pools have succeeded, as further described below, such that authentication is a success in a step 310 or whether a least one pool has failed such that authentication has failed in a step 312.

If a determination is made in step 306 that additional authentication pools remain, a next authentication pool processing is initiated in a step 314. Processing of an authentication pool includes determining whether the authentication pool includes at least one authentication method in a step 316. If the authentication pool does not include any authentication methods, or testing of the authentication pool is considered complete, the method resumes implementation with step 306.

If it is determined in step 316 that the authentication pool includes a least one authentication method, a determination is made in the step 318 whether the authentication method has been previously utilized in the current response to an authentication request. The determination in step 318 may include determining whether the method has been implemented within the current authentication pool and/or whether the method has been implemented within any other authentication pool. If it is determined in step 318 that the authentication method has previously been implemented, the method may be configured to return to the determination of step 316.

If it is determined in step 318 that the authentication method has not previously been implemented, the authentication method may be implemented beginning with a step 320 in which an instance of the authentication method is obtained. Obtaining an instance of an authentication method can include obtaining an identifier that uniquely corresponds to an authentication method, requesting creation of a physical object corresponding to that identifier from the operating system, and transmitting a query to the physical object to determine whether the object has been configured to function within the authentication system described herein. Following step 320, in a step 322, a determination is made whether additional information is needed to implement the authentication method. If additional information is needed, a determination is made in the step 324 whether engine 124 and or system 120 can supply the required information. If information is available, the information is provided in a step 326 and the method returns to step 322. If the information may not be supplied and/or the wrong information is supplied, the authentication method fails in a step 328.

If it is determined in step 322 that no additional information is needed or after the information has been obtained, the authentication method attempts authentication in a step 330. If it is determined in a step 332 that the authentication method is successful, the method returns to step 306. If the authentication method is not successful, the method fails as previously described with reference to step 328.

Figure 4:
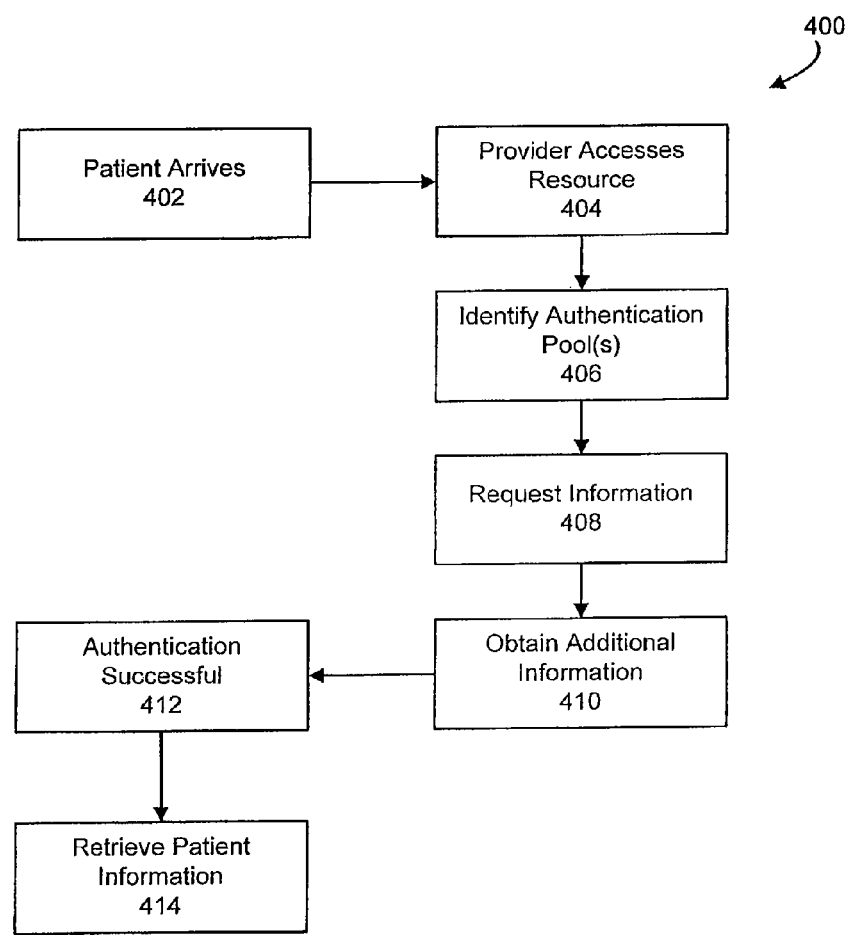
FIG. 4 is a flowchart illustrating a method for implementing authentication pool based authentication to identify a patient, according to an exemplary embodiment.

Referring now to FIG. 4, a flowchart 400 illustrating a method for implementing authentication pool based authentication to identify a patient is shown, according to an exemplary embodiment. The authentication method may be implemented by the authentication engine 124, illustrated and described above with reference to FIG. 1.

In a first step 402, a patient arrives at an urgent care clinic associated with a health care provider. Upon arrival, a front desk clerk receives identification information from the patient to initiate the provision of healthcare. Using the received identification information, front desk clerk may desire to authenticate the identity of the patient. Accordingly the front desk clerk may access a patient identification resource in a step 404. Based upon the authentication request, authentication system 120 may be configured to determine whether access to the resource identified in step 404 is associated with one or more authentication pools in a step 406.

If needed, and as described above with reference to FIG. 3, engine 124 may be configured to identify whether additional information is needed to implement one or more authentication methods within the authentication pools identified in step 406. If additional information is required, a step 410 may be performed to obtain additional information. Obtaining additional information may include asking the patient questions, using one or more devices, etc.

In a step 412, a determination is made to determine whether the patient has been successfully authenticated. If the patient has been authenticated, patient information may be retrieved in a step 414 allowing the healthcare provider to begin providing medical care.

Although described with reference to flowchart 400 as being implemented for patient authentication, authentication systems and methods may also be used for the purpose of controlling medication administration, verifying the identity of patients already being cared for by the healthcare provider, etc.

Figure 5:
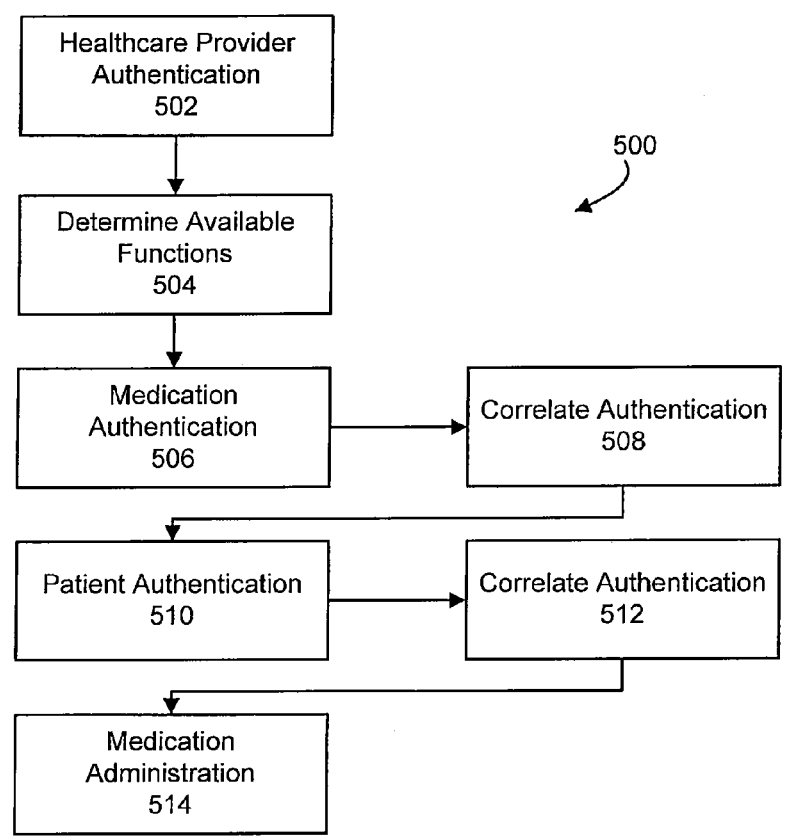
FIG. 5 is a flowchart illustrating a method for administering a medication to a patient using authentication pool based authentication to identify the patient, the healthcare provider administering the medication, and the medication itself, according to an exemplary embodiment.

Referring now to FIG. 5, a flowchart 500 illustrating a method for administering a medication to a patient using authentication pool based authentication to identify the patient, the healthcare provider administering the medication, and the medication itself is shown, according to an exemplary embodiment. The authentication method may be implemented by the authentication engine 124, illustrated and described above with reference to FIG. 1.

Using the method of flowchart 500, the process by which a healthcare provider administers a medication to a patient may be significantly improved. In a first step 502, in preparing to administer the medication, the healthcare provider may be required to identify themselves for authentication. System 120 may be configured to authenticate the user using at least one authentication pool. Exemplary authentication methods may include requiring that the healthcare provider enters a password associated with their unique ID, requiring that the healthcare provider have their ID badge including an RFID tag, requiring that the healthcare provider provide biometric input, etc. Based upon the authentication request, authentication system 120 may be configured to determine whether the healthcare provider is authorized to perform the functions associated with flowchart 500, what medications the healthcare provider has been authorized to administer, what patients are associated with the healthcare provider, etc. in a step 504.

Following healthcare provider authentication, system 120 may be configured to require authentication of the medication to be administered in a step 506. Authenticating a medication may include receiving a manual entry by the healthcare provider, receiving a value from a barcode reader, receiving an RFID value associated with the medication, etc. System 120 may be configured to associate different types and/or numbers of authentication pools depending on the type of medication to be administered. For example, for a narcotic medication, additional authentication pools may be required and successful satisfaction of all of the authentication pools and/or all of the authentication methods in an authentication pool may be required. In contrast, for a less controlled medication, system 120 may be configured to provide authentication based on successful satisfaction of any one authentication method.

In a step 508, following authentication of both the healthcare provider and the medication to be administered, system 120 may be configured to correlate the authentication of steps 502 and 506. Correlating authentications may include verifying that in addition to satisfying one or more authentication methods in one or more of the authentication pools, the healthcare provider is authorized to administer the medication that was authenticated in step 506. This additional step may be used to reduce the likelihood of human error.

In a step 510, system 120 may be configured to require authentication of the patient to whom the medication is to be administered. Authenticating a patient may include scanning a barcode on a patient wristband, taking a biometric reading, etc. In a step 512, authentication may further include extending the correlation of step 508 to verify that the patient is both associated with the healthcare provider (i.e., the healthcare provide is authorized to care for and/or administer medication to the specific patient) and that an order has been given that the patient is to receive the specific medication. In a step 514, the healthcare provider may administer the medication.

In order to implement the authentication correlation described above, system 120 may be coupled to an electronic medical record system. The electronic medical record system may include the data that would be typically found in a medical record such as medication orders, healthcare providers associated with a patient, medication allergies, biometric identification information, etc. The electronic medical record systems may be, for example, of the type manufactured by Epic Systems Corporation of Verona, Wis. under the tradenames of EpicCare and Epicenter.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a server" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. It should be understood that a computer program may embrace constituent programs and that multiple programs may be implemented as a single or multiple programs.

It is specifically intended that the present invention not be limited to the embodiments and illustrations contained herein and the claims should be understood to include modified forms of those embodiments including portions of the embodiments and combinations of elements of different embodiments as come within the scope of the following claims.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

The present invention has been described in terms of the preferred embodiment, and it is recognized that equivalents, alternatives, and modifications, aside from those expressly stated, are possible and within the scope of the appending claims.

We claim:

1. A computer-implemented authentication method, comprising:
   (a) receiving an authentication request at an authentication computing system, the request including a resource identifier;
   (b) identifying one or more authentication pools associated with the resource identifier, each authentication pool including at least one authentication method selected from the group including a password, passphrase, personal identification number, challenge response, identification card, wristband, security token, software token, cell phone, biometric information, fingerprint, retinal pattern, signature, face, and voice;
   (c) executing a pool authentication process for the one or more identified authentication pools, the pool authentication process including a two stage authentication process, including at least one first stage that includes performing an authentication method implementation included in the authentication pool and a second stage dependent on the first stage; and (d) transmitting a response to the identification authentication request based on the execution of the pool authentication process for the one or more identified authentication pools.

2. The method of claim 1, wherein executing a pool authentication process includes identifying the one or more authentication method implementations that are to be performed.

3. The method of claim 2, wherein executing a pool authentication process further includes generating an authentication method response, including
transmitting information to one or more of the identified authentication method implementations;
generating a device authentication response based on the transmitted information.

4. The method of claim 2, further including determining whether an authentication method implementation has been used in the current authentication process in any authentication pool.

5. The method of claim 4, further including selecting an alternate method implementation from an authentication pool based on a determination that an authentication method implementation has been used in the current authentication process.

6. The method of claim 1, wherein identifying one or more authentication pools associated with the resource identifier includes accessing an authentication database including a table of resource identifiers and a table of authentication pools, each resource identifier including an association with one or more authentication pools, each authentication pool including an association with one or more authentication method implementations.

7. The method of claim 6, wherein the table includes at least one authentication method implementation associated with more than one authentication pool.

8. The method of claim 1, wherein the authentication request includes a request to identify a patient seeking medical care using a biometric reader as at least one authentication method implementation in the authentication process.

9. The method of claim 1, wherein the authentication request includes a request to identify a medicine to be administered to a patient using a barcode reader as at least one authentication method implementation in the authentication process.

10. A computer-implemented authentication system, comprising:
an authentication data table, the table including
one or more resource identifiers, and
at least one authentication pool associated with each resource identifier, the pool including at least one authentication method selected from the group including a password, passphrase, personal identification number, challenge response, identification card, wristband, security token, software token, cell phone, biometric information, fingerprint, retinal pattern, signature, face, and voice;
an authentication engine configured to
receive an authentication request at an authentication computing system, the request including a resource identifier,
identify one or more authentication pools associated with the resource identifier, and
execute a pool authentication process for the one or more identified authentication pools, the pool authentication process including a two stage authentication process, including at least one first stage that includes performing an authentication method implementation included in the authentication pool and a second stage dependent on the first stage; and
an authentication reporting engine configured to provide a response to the identification authentication request based on the execution of the pool authentication process for the one or more identified authentication pools.

11. The system of claim 10, wherein executing a pool authentication process includes identifying the one or more authentication method implementations that are to be performed.

12. The system of claim 11, wherein executing a pool authentication process further includes generating an authentication method response, including
transmitting information to one or more of the identified authentication method implementations;
generating a device authentication response based on the transmitted information.

13. The system of claim 11, wherein the authentication engine is configured to determine whether an authentication method implementation has been used in the current authentication process in any authentication pool.

14. The system of claim 13, wherein the authentication engine is configured to select an alternate method implementation from an authentication pool based on a determination that an authentication method implementation has been used in the current authentication process.

15. The system of claim 10, wherein the data table includes at least one authentication method implementation associated with more than one authentication pool.

16. The system of claim 10, wherein the authentication request includes a request to identify a patient seeking medical care using a biometric reader as at least one authentication method implementation in the authentication process.

17. The system of claim 10, wherein the authentication request includes a request to identify a medicine to be administered to a patient using a barcode reader as at least one authentication method implementation in the authentication process.

18. A computer-implemented authentication system for use in administering a controlled substance, comprising:
an authentication data table, the table including
one or more resource identifiers associated with the controlled substance, and
at least two authentication pools associated with the one or more resource identifiers, each pool including at least one authentication method selected from the group including a password, passphrase, personal identification number, challenge response, identification card, wristband, security token, software token, cell phone, biometric information, fingerprint, retinal pattern, signature, face, and voice;
an authentication engine configured to
receive an authentication request at an authentication computing system, the request including a resource identifier,
identify at least first and second authentication pools associated with the resource identifier,
execute a pool authentication process for the first identified authentication pool, including executing a first authentication method implementation, and
execute a pool authentication process for the second identified authentication pool, including executing a second authentication method implementation that is different than the first authentication method; and
an authentication reporting engine configured to provide a response to the identification authentication request based on a determination indicating successful execution of the first and second pool authentication processes for the at least first and second identified authentication pools.

19. The system of claim 18, wherein the authentication engine is configured to determine whether an authentication method implementation has been used in the current authentication process in any authentication pool.

20. The system of claim 18, wherein first and second authentication pools including authentication methods directed to at least authentication an identity of a healthcare provider authorized to administer the controlled substance.

* * * * *